United States Patent Office 3,101,145
Patented Aug. 20, 1963

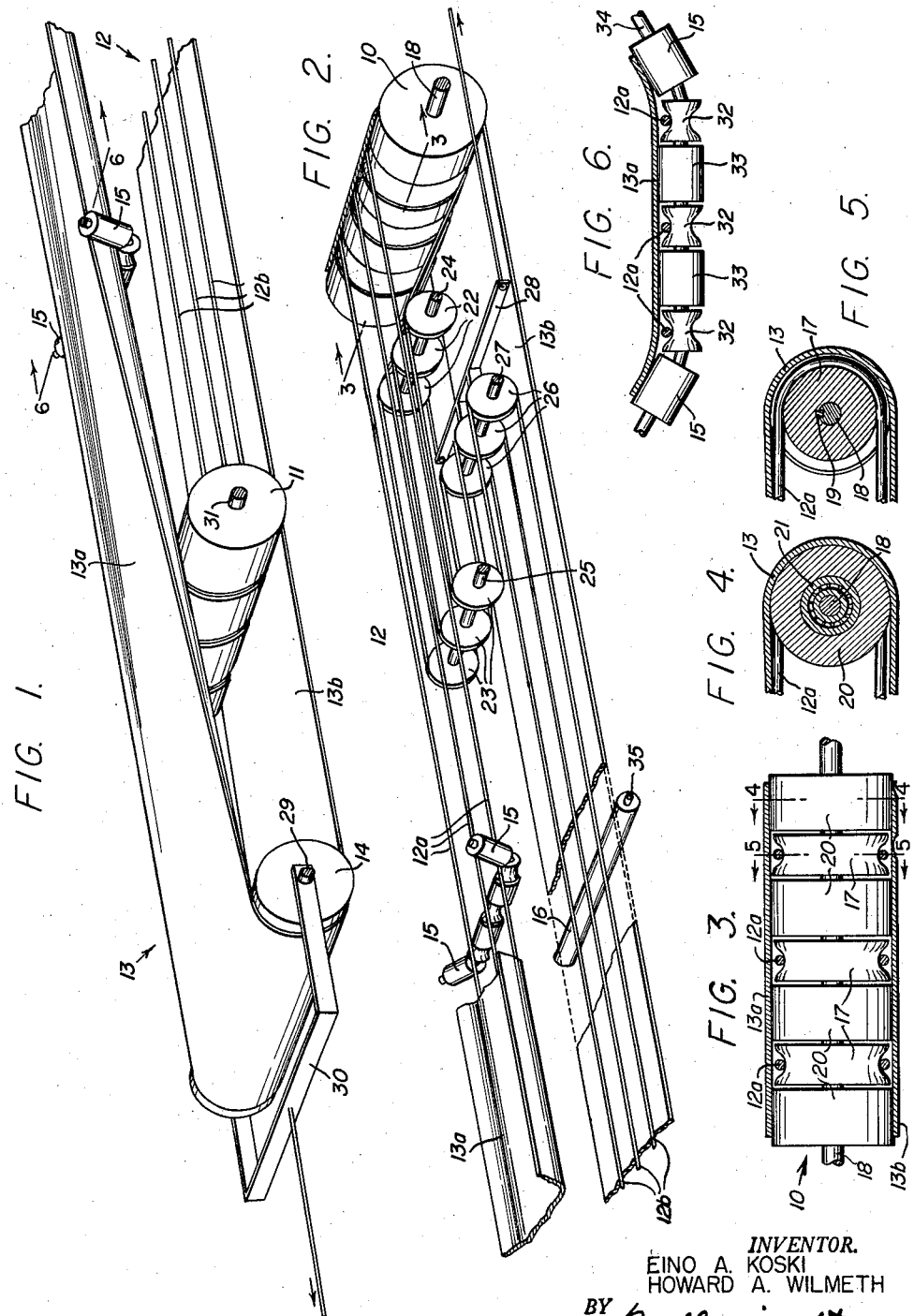

3,101,145
CABLE-SUPPORTED BELT CONVEYOR
Eino A. Koski and Howard A. Wilmeth, Silver City, N. Mex., assignors to Kennecott Copper Corporation, New York, N.Y., a corporation of New York
Filed Mar. 28, 1962, Ser. No. 183,125
4 Claims. (Cl. 198—203)

This invention relates to endless belt conveyors and particularly to those utilizing endless cables or the like to support and drive the load-carrying belt.

The usual belt conveyor as extensively used in the mining and construction industries for hauling ore, rock, and other materials in a continuous stream is constructed to apply driving force directly to the load-carrying belt, which is supported by head and tail pulleys and by numerous idlers placed at closely spaced intervals along the conveying lengths of the belt.

In recent years special types of belt conveyors have been developed, primarily for exceptionally long hauls and the handling of large and heavy rocks, whereby the load-carrying belt is supported and driven by endless cables or the like susceptible of relatively taut tensioning and capable of supporting heavy loads without the structural damage experienced with belting, which is considerably less durable when driven directly.

Principal objects in the making of the present invention were to simplify the construction of and make more economical such special types of belt conveyors, so they would find greater applicability in industry than previously.

An outstanding feature of the invention in the accomplishment of these objects is the provision of a special drive pulley over which both cables and belt are trained, with the cables being positively driven and the belt idling.

There is shown in the accompanying drawing apparatus representing what is presently regarded as the best mode of carrying out the invention. From the detailed description of this, other more specific objects and features of the invention will become apparent.

In the drawing:

FIG. 1 is a fragmentary view in perspective of an endless belt conveyor conforming to the invention, only the tail portion being shown;

FIG. 2, a similar view showing only the head portion and with intermediate portions of the belt broken out to reveal underlying structure;

FIG. 3, a transverse vertical section taken on the line 3—3 of FIG. 2 and drawn to a somewhat larger scale;

FIG. 4, a vertical section taken on the line 4—4 of FIG. 3;

FIG. 5, a similar view taken on the line 5—5 of FIG. 3; and

FIG. 6, a transverse vertical section taken on the line 6—6 of FIG. 1.

Referring to the drawing:

In its illustrated form, the conveyor comprises a terminal head pulley assembly 10 and a terminal tail pulley 11, about which a plurality of endless cables 12 are trained in mutually spaced, side-by-side, series arrangement as driving support for a load-carrying, endless belt 13.

Although belt 13 is trained about head pulley assembly 10 in common with the cables 12, it has its own terminal tail pulley 14. A longitudinal series of widely spaced, belt-troughing idlers 15 supports the load-carrying runs 12a of the respective cables and 13a of the belt along their lengths intermediate the terminal pulleys. A similar series of idlers 16 supports the return runs 12b of the respective cables and 13b of the belt along the lengths of same.

It should be noted that the load-carrying runs 12a of the respective cable underlie and support the load-carrying run 13a of the belt, but that the return run 12b of such cables overlie and, in this instance, rest upon the return run 13b of the belt.

It is a feature of the invention that the head pulley assembly 10 comprises drive sheaves 17, FIG. 3, for the respective cables 12, such sheaves being rigidly secured to drive shaft 18 as by means of respective keys 19, FIG. 5, and alternating with idler pulleys 20 of somewhat larger diameter for receiving and supporting the belt 13. Idlers 20 are rotatably mounted on drive shaft 18 as by means of anti-friction bearings 21. Shaft 18 is rotatably mounted in fixed position and is arranged to be power driven in any suitable manner.

Drive cables 12 and conveyor belt 13 are independently tensioned. For this purpose, the cables are trained over and about sets of guide pulleys 22 and 23 mounted in common on firmly positioned shafts 24 and 25, respectively, and about a set of tensioning pulleys 26 mounted in common on shaft 27, which is, in turn, mounted in sliding bearings (not shown) for back and forth movement longitudinally of the conveyor. A suitable weight or other tensioning means (not shown) is attached to shaft 27 by means of yoke 28 in customary manner. Similarly, terminal tail pulley 14, around which conveyor belt 13 is trained, is mounted on a shaft 29 which is, in turn, mounted in sliding bearings (not shown) for back and forth movement longitudinally of the conveyor. A suitable weight or other tensioning means (not shown) is attached to shaft 29 by means of a yoke 30.

Terminal tail pulley 11 for cables 12 is mounted on a firmly positioned shaft 31. Its cylindrical periphery is preferably grooved, to recess the cables flush therewith, so that it may be advantageously positioned in contact with the upper surface of the return run 13b of conveyor belt 13, as indicated in FIG. 1, to position the return runs 12b directly upon the return run of the conveyor belt for support.

The belt-troughing idlers 15 include sheave idlers 32, FIG. 6, for the respective drive runs 12a of the cables 12, alternating with cylindrical idlers 33 for the load-carrying run 13a of conveyor belt 13, these two types of idlers being mounted in common on a flexible shaft 34 supported in customary manner by suitable idler brackets (not shown).

It is to be understood that shaft 31 of terminal tail pulley 11, shafts 24 and 25 of guide pulleys 22 and 23, and shafts 35, FIG. 2, of respective idlers 16 are mounted in some suitable and well known manner (not shown).

From the above, it will be seen that both the drive cables 12 and the conveyor belt 13 are driven at synchronous speeds by reason of the idlers 20 freely rotatable on drive shaft 18, it being realized that the frictional engagement between cable drive runs 12a and load-carrying belt run 13a serves to drive conveyor belt 13.

Whereas there is here illustrated and described a specific form of apparatus which we presently regard as the best mode of carrying out our invention, it should be understood that various changes may be made without departing from the inventive concepts particularly pointed out and distinctly claimed herebelow.

We claim:

1. In a cable-supported, endless, belt conveyor having a plurality of endless cables arranged to support a single endless conveyor belt and to drive it by reason of mutual frictional contact, a drive pulley assembly around which both cables and belt are trained, said assembly comprising a drive shaft; drive sheaves for the respective cables, said sheaves being rigidly secured to said shaft so as to rotate therewith; and supporting pulleys for the conveyor belt, said pulleys being rotatably mounted on said shaft so as to idle as the belt travels.

2. The combination set forth in claim 1, including separate tail pulleys for cables and belt, the tail pulley for the cables being positioned adjacent to the upper surface of the return run of the belt, between the load-carrying and the return runs of said belt, so that the return runs of the cables will be supported by the return run of the belt.

3. The combination set forth in claim 2, including tensioning means for the cables and independent tensioning means for the belt.

4. A cable-supported, endless, belt conveyor, comprising a plurality of endless cables arranged to support a single endless conveyor belt and to drive it by frictional contact; an endless conveyor belt extending longitudinally of said cables and entirely enclosing them, except laterally, the underside of the upper, load-carrying run of said belt resting in frictional drive contact on the upper, load-supporting runs of the respective cables; a common drive pulley assembly made up of a drive shaft, sheaves for the respective cables mounted on said shaft to rotate therewith, and idler pulleys for the belt mounted by said shaft to rotate freely thereon; and idler means supporting cables and belt along their lengths.

References Cited in the file of this patent

UNITED STATES PATENTS

| | | |
|---|---|---|
| 1,726,555 | Gammeter | Sept. 3, 1929 |
| 2,429,100 | Loose | Oct. 14, 1947 |
| 2,971,633 | Geoffroy | Feb. 14, 1961 |
| 2,975,885 | Grundelman | Mar. 21, 1961 |